United States Patent [19]

Schafferkotter

[11] Patent Number: 4,880,042

[45] Date of Patent: Nov. 14, 1989

[54] DEVICE FOR CUTTING MOLDING AND METHOD THEREFOR

[76] Inventor: Harvey W. Schafferkotter, 17200 Finch Path, Farmington, Minn. 55024

[21] Appl. No.: 276,126

[22] Filed: Nov. 25, 1988

[51] Int. Cl.⁴ .......................... B27C 5/10; B27M 3/00
[52] U.S. Cl. .................... 144/372; 144/134.D; 144/144 R; 144/144.5 R; 409/130; 409/182
[58] Field of Search .................. 409/130, 182; 144/82, 144/83, 84, 87, 88, 134 D, 136 C, 144 R, 144 S, 372

[56] References Cited

U.S. PATENT DOCUMENTS

| | | |
|---|---|---|
| 4,274,459 | 6/1981 | Galajda . |
| 4,353,672 | 10/1982 | Smith . |
| 4,355,557 | 10/1982 | Mecsey . |
| 4,373,562 | 2/1983 | Vernon ............................ 144/144.5 |
| 4,542,776 | 9/1985 | Kehoe . |
| 4,579,158 | 4/1986 | O'Meara . |
| 4,640,324 | 2/1987 | Lounds . |

Primary Examiner—W. Donald Bray
Attorney, Agent, or Firm—Rogers, Howell & Haferkamp

[57] ABSTRACT

A device for cutting a segment of molding for angular mating with a second segment of molding. The device comprises a table portion for holding a segment of molding, and a cutter guide portion for guiding a cutting mechanism. The cutter guide portion is mounted on the table portion and comprises a template oriented angularly with respect to the table portion. The template can receive a cutting mechanism extending through an opening in the template such that the cutting mechanism extends angularly with respect to a segment of molding held on the table portion. The opening is shaped such that a segment of molding held on the table portion may be cut by tracing the opening with the cutting mechanism, thereby providing the segment of molding with a recessed angle at one end and an edge at that end corresponding to the contour of a second segment of molding to which said first segment is to be mated. Related methods are also disclosed.

6 Claims, 2 Drawing Sheets

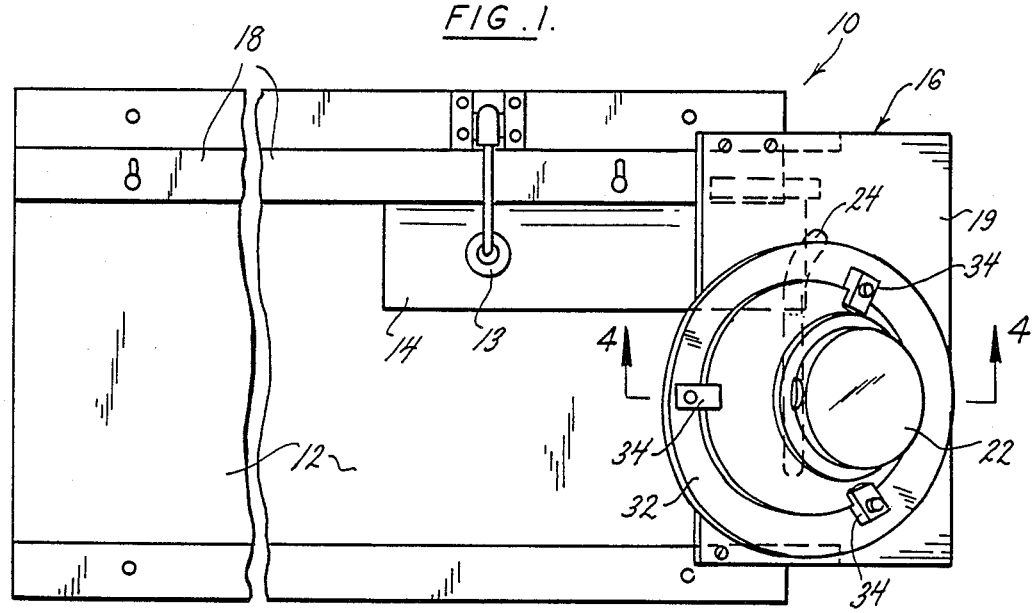
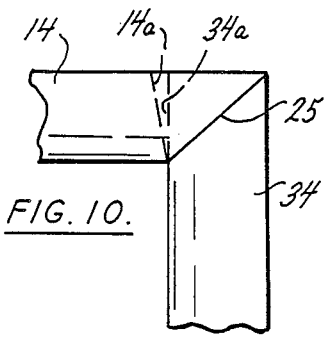
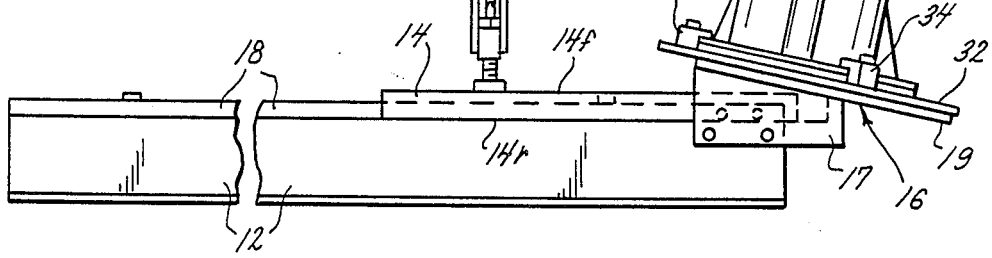
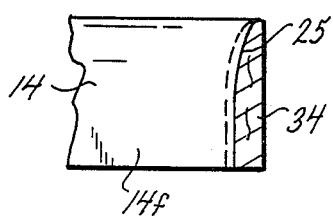
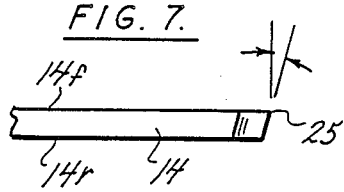

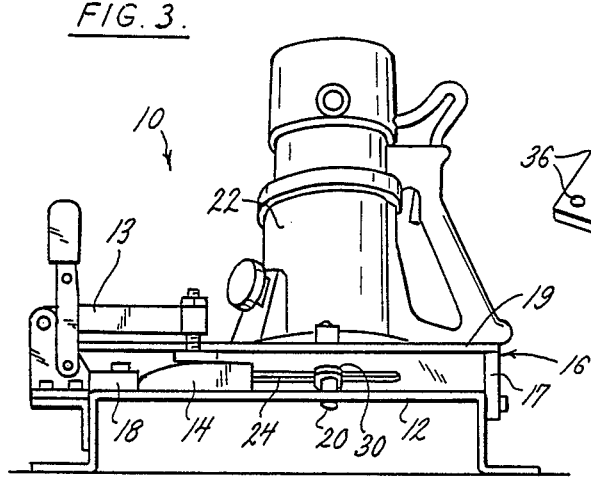
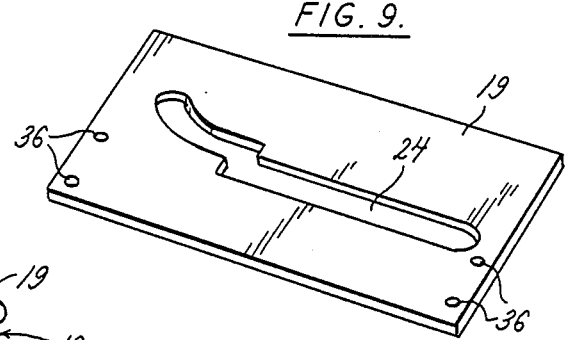
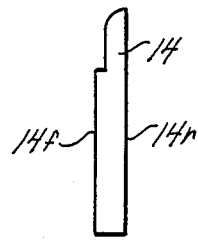
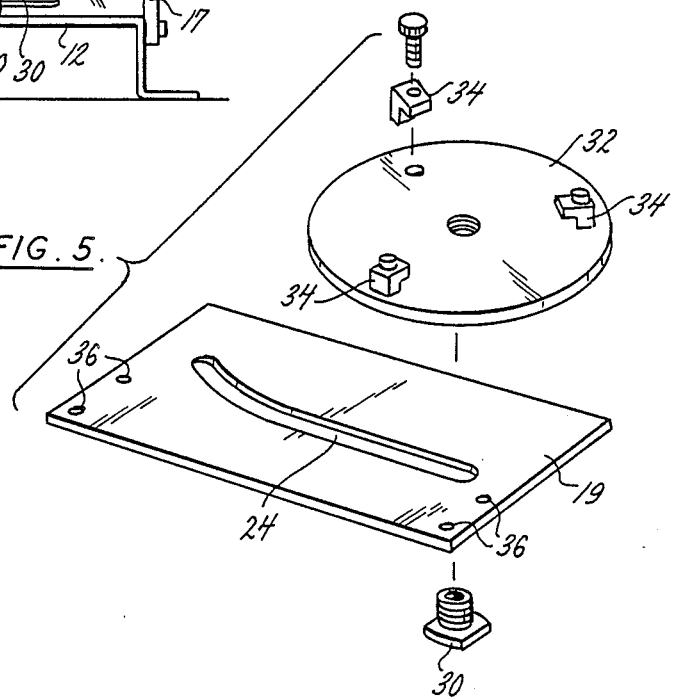
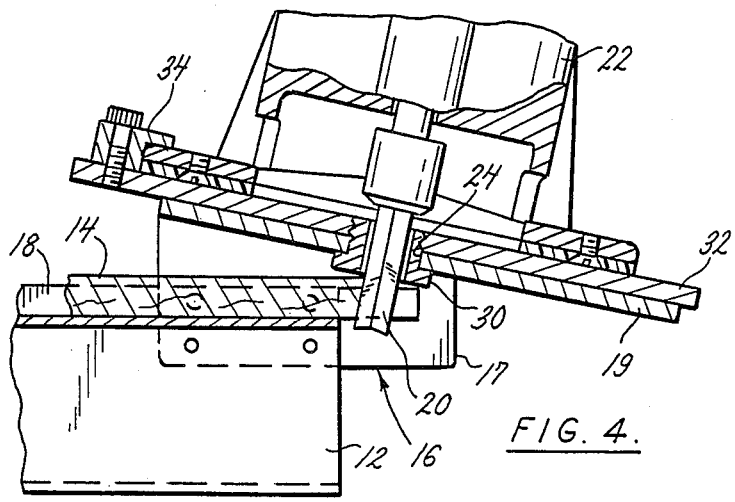

DEVICE FOR CUTTING MOLDING AND METHOD THEREFOR

BACKGROUND AND SUMMARY OF THE INVENTION

The present invention relates to cutting of molding, and more particularly to cutting of a segment of wall molding for inside corner mating with a second segment of wall molding.

Conventionally, cutting molding to fit in inside corners requires a two-step procedure. First, the molding is cut angularly with a miter saw. Then, with a coping saw, the end of the first molding segment is cut back to conform with the contour of the second segment of molding to which the first segment is to be mated.

This two-step procedure not only is time-consuming and requires use of two different tools, but also demands talent and dexterity. In particular, the coping step is especially time-consuming and must be performed very carefully to maintain an accurate and nick-free line to ensure a good fit with the second segment. Even a relatively minor deviation of the line being cut from the contour of the second segment may result in a very noticeable improper fit between the segments.

The present invention overcomes such problems associated with cutting of a segment of molding for mating with a second segment in a corner. The device of the present invention significantly reduces the amount of skill necessary to perform the job, and effectively miters and copes a segment of molding in one step. The segment is then ready for angular mating with a second segment of molding.

The device comprises a table portion for holding a segment of molding and a cutter guide means mounted on the table portion. A template is mounted on the cutter guide means in a manner to receive a cutting means through an opening in the template such that the cutting means extends angularly with respect to the table portion and thus to a segment of molding held on the table portion. The cutting means extends at an angle and the opening in the template is shaped such that when the opening is traced with the cutting means, a segment of molding held on the table portion is cut at a recessed angle, and the forward edge at the end of the segment that is cut corresponds to the cross-section of a second segment of molding to which the first segment is to be mated. Generally, the cutting means may be a router bit extending from a router mountable on the template.

The device of the present invention therefore avoids the need to carefully hand-cope the molding, and the dexterity involved in such a maneuver. Instead, a single sweep with a router along a template completes the task.

Additional advantages and features of the present invention will become apparent from the following description of the preferred embodiments taken in conjunction with the accompanying drawings and the claims appended hereto.

BRIEF DESCRIPTION OF THE DRAWINGS

FIG. 1 is a broken-away top plan view of a molding cutting device of the invention;
FIG. 2 is a side elevational view of the device;
FIG. 3 is a left end elevational view of the device;
FIG. 4 is a sectional view taken along line 4—4 of FIG. 1;
FIG. 5 is an exploded view of the router plate and template combination of the device;
FIG. 6 is an elevational view of a pair of segments of molding mated in the corner of a room, one segment of which has been cut with the device;
FIG. 7 is a bottom view of a molding segment that has been cut with the device;
FIG. 8 is a sectional view of one style of typical molding; and
FIG. 9 is a template of this invention for one style of typical molding.
FIG. 10 is a plan view of a pair of segments of molding mated in the inside corner of a room, one segment of which has been cut with the device of this invention.

Corresponding reference numerals refer to corresponding features throughout the several figures of the drawings.

DETAILED DESCRIPTION OF THE PREFERRED EMBODIMENTS

Referring now to the drawings and in particular to FIGS. 1-9, there is illustrated a molding cutting device, generally designated 10, and constructed in accordance with and embodying the features of the present invention. The device comprises a table portion 12 for holding a segment of molding 14 and a cutter guide means such as a router guide portion 16 mounted on the table portion 12.

The table portion 12 has a clamping means 13 for holding the segment of molding 14 firmly onto the table portion 12 and against a guide 18 on the table portion 12 to ensure alignment of the molding 14. Tee molding 14 has opposing faces 14f and 14r and is held on the table portion 12 and against the guide 18 so that the front face 14f of the molding 14, that is, the face that is exposed when the molding 14 is installed on a wall, faces upward.

The router guide portion 16 is located at one end of the table portion 12. The router guide portion 16 comprises a mounting means or base 17 and a template 19 mounted angularly thereon for receiving cutting means such as a router bit 20 (not shown in FIG. 1) extending from a router 22 mounted on the router guide portion 16 through an opening 24 in the template 19. The router bit 20 extends angularly with respect to the segment of molding 14 held on the table portion 12. That is, the router bit 20 extends at an angle offset from a line normal to the faces of molding 14. The opening 24 in the template is shaped to correspond to the contour of a segment of molding to which the segment of molding 14 is to be mated. Ordinarily, molding is mated with molding of the same contour. Thus, the contour of a segment of molding to which the segment of molding 14 is to be mated is the same as the contour of the molding 14.

Thus, the segment of molding 14 held on the table portion 12 may be cut by tracing the opening 24 with the router bit 20, and the segment of molding 14 in one step is provided with a recessed angle at one end and a leading edge 25 at that end corresponding to the contour of a second segment of molding to which the first segment of molding 14 is to be mated.

As shown in FIG. 4, the router 22 is mounted on the template 19 by means of a spacer bushing 30, which extends through the template opening 24 and threadably engages a router plate 32. The bushing 30 has an axial passage therethrough. The router plate 32 clamps to the router 22 by means of screw-on clip mounts 34 (shown in FIG. 5) such that the router bit 20 extends through the axial passage in the bushing 30. (See FIG. 4).

As shown in FIGS. 2-4, the template 19 is mounted angularly so that when the router 22 is mounted thereto, the router bit 20 extends angularly with respect to the molding 14. More specifically, the router bit 20 extends at an angle offset from 90° with respect to the length of the molding 14 such that the bit 20 may cut a relief or recessed angle in the molding 14, as shown in FIG. 7. As used in this application, ""relief angle" or recessed angle" means that the edge 25 of the front face 14f of the segment of molding 14, that is, the face that is exposed when the molding is installed, extends beyond the rear face 14r of the segment of molding 14 (the face facing the wall and hidden from view when the molding is installed), so that when the molding 14 is installed against a wall, the angle cut in the molding 14 is hidden from view. See FIGS. 6 and 7. Thus, the angle at which the router bit 20 extends lies in a plane parallel to the longitudinal axis of the segment being cut.

As noted, the opening 24 in the template 19 is shaped to correspond to the contour of the front face of the molding to which the molding 14 is to be mated. Therefore, when the template opening 24 is traced with the router bit 20, the router bit not only cuts a recessed angle, but also "copes" the edge of the molding so that the cut end of molding will mesh with the second segment of molding 34 to which it is mated, as shown in FIG. 6. The recessed angle allows the two segments of molding to be pivoted with respect to one another while remaining mated and therefore to accommodate room corners that are not quite right angles without creating a gap or exposure of the unfinished inside of molding 14.

It has been found that the recessed angle, shown in FIG. 7 as the angle by which the cut deviates from 90° from the length or faces of the molding 14, is preferably 10° to about 20°, and optimally about 10° to about 12°. It has been found that if the angle is significantly larger than about 20°, the edge of the molding 14 is undesirably fragile, while angles of less than about 10° do not provide sufficient relief to allow pivotability to accommodate inside corners which deviate from 90°, particularly inside corners at which the walls meet to form an obtuse angle.

The template 19 should be easily replaceable to allow the use of a variety of templates for the several styles of baseboard molding. As shown in FIG. 4, the template 19 may be attached to the base 17 with bolts that extend through holes 36. The template shown in FIGS. 1 and 5 corresponds to the standard ranch molding shown in FIG. 6. If, for example, Princeton style molding, a cross-section of which is shown in FIG. 8, is being used, then a template having an opening shown in FIG. 9 would be employed. Although baseboard molding is shown in the drawings, it will be understood that other molding, such as crown molding or chair rails, are similarly contemplated. Biased crown molding (crown molding fitted angularly between wall and ceiling) may also be cut with the device of this invention with appropriate angle orientation.

FIG. 10 shows a plan view of a pair of segments of molding mated in the inside corner of a room, one segment of which has been cut with the device of this invention. The leading edge 25 of the molding segment 14, which has been cut with a device of this invention, follows the contour of the molding segment 34. Phantom line 34a shows the continuation of the front face of the molding segment 34, illustrating how the uncut molding segment 34 buts up against a wall. Phantom line 14a represents the end of the segment 14 at a point about halfway up the molding and shows how the end of the molding segment 14 is cut at a recessed angle to allow the molding segment 14 to be pivoted about segment 34 to accommodate corners which are not 90°.

In an alternative embodiment, the base 17 may be an extension of the template 19 and integral therewith. In this embodiment, instead of the base 17 remaining attached to the table portion 12 and only the template 19 being replaceable, the entire cutting guide portion 16, that is, the template 19 together with the base 17 is replaceable with a second cutter guide portion (a second template and base combination).

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A device for cutting a segment of molding for angular mating with a second segment of molding, comprising:

a table portion for holding a segment of molding; and a cutter guide means for guiding a cutting means, said cutter guide means being mounted on said table portion and comprising a template oriented angularly with respect to the table portion for receiving a cutting means extending through an opening in the template such that said cutting means extends angularly with respect to a segment of molding held on said table portion, said opening being shaped such that a segment of molding held on said table portion may be cut across the width of the molding by tracing said opening with the cutting means, thereby providing said segment of molding with a recessed angle at one end and an edge at that end corresponding to the contour of a second segment of molding to which said first segment is to be mated.

2. A device as set forth in claim 1 wherein said cutting means is a router bit extending from a router mounted on said cutter guide means.

3. A device as set forth in claim 2 wherein said cutting means extends at an angle offset from normal to the longitudinal axis of said segment of molding.

4. A device as set forth in claim 3 wherein said template is removable and replaceable with a second template.

5. A device as set forth in claim 3 wherein said cutter guide means is removable and replaceable with a second cutter guide means.

6. A method for cutting a segment of molding for angular mating with a second segment of molding, comprising:

holding a frst segment of molding on a table portion, said first segment of molding having a front face which is exposed when the first segment of molding is installed on a wall and a rear face which faces the wall and is hidden from view when the first segment of molding is installed on a wall; and angularly cutting said first segment of molding with a cutting means extending through an opening in a template angularly mounted to said table, said cutting means being angled and said opening being shaped such that by tracing said opening with the cutting means, the first segment of molding may be cut at an angle such that the edge of said front face of said first segment of molding extends beyond said rear face of said first segment of molding and the edge of said front face which extends beyond said rear face corresponds to the outline of a corresponding front face of a second segment of molding to which said first segment is to be mated.

* * * * *